US008286705B2

(12) United States Patent
Ocalan et al.

(10) Patent No.: US 8,286,705 B2
(45) Date of Patent: Oct. 16, 2012

(54) APPARATUS AND METHOD FOR TREATING A SUBTERRANEAN FORMATION USING DIVERSION

(75) Inventors: Murat Ocalan, Boston, MA (US); Francois Auzerais, Boston, MA (US); Partha Ganguly, Woburn, MA (US); Agathe Robisson, Cambridge, MA (US); Jahir Pabon, Newton, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 319 days.

(21) Appl. No.: 12/628,001

(22) Filed: Nov. 30, 2009

(65) Prior Publication Data

US 2011/0127042 A1 Jun. 2, 2011

(51) Int. Cl.

| | |
|---|---|
| ***E21B 33/138*** | (2006.01) |
| ***E21B 43/25*** | (2006.01) |
| ***E21B 43/26*** | (2006.01) |
| *C09K 8/66* | (2006.01) |
| *C09K 8/70* | (2006.01) |

(52) U.S. Cl. ..................... 166/283; 166/75.11; 166/292; 166/308.3; 166/373; 507/270; 507/271; 507/904

(58) Field of Classification Search ........................ None
See application file for complete search history.

(56) References Cited

U.S. PATENT DOCUMENTS

| | | | | |
|---|---|---|---|---|
| 3,806,449 | A * | 4/1974 | Kaiser | 210/634 |
| 4,579,173 | A * | 4/1986 | Rosensweig et al. | 166/248 |
| 4,695,393 | A * | 9/1987 | Chagnon et al. | 252/62.54 |
| 4,802,534 | A * | 2/1989 | Larson et al. | 166/381 |
| 5,578,238 | A * | 11/1996 | Weiss et al. | 252/62.52 |
| 5,645,752 | A * | 7/1997 | Weiss et al. | 252/62.54 |
| 5,906,767 | A * | 5/1999 | Karol et al. | 252/62.52 |
| 6,203,717 | B1 * | 3/2001 | Munoz et al. | 252/62.52 |
| 6,250,848 | B1 * | 6/2001 | Moridis et al. | 405/263 |
| 6,926,089 | B2 * | 8/2005 | Goodson et al. | 166/387 |
| 7,148,184 | B2 | 12/2006 | Francini et al. | |
| 7,299,870 | B2 | 11/2007 | Garcia-Lopez De Vioctoria et al. | |
| 7,380,600 | B2 | 6/2008 | Willberg et al. | |
| 7,380,601 | B2 | 6/2008 | Willberg et al. | |
| 7,506,689 | B2 | 3/2009 | Surjaatmadja et al. | |
| 7,565,929 | B2 | 7/2009 | Bustos et al. | |
| 2003/0042461 | A1 * | 3/2003 | Ulicny et al. | 252/62.52 |
| 2003/0166470 | A1 * | 9/2003 | Fripp et al. | 507/100 |
| 2005/0194140 | A1 | 9/2005 | Dalrymple et al. | |
| 2006/0021753 | A1 | 2/2006 | Wilkinson | |
| 2008/0000639 | A1 | 1/2008 | Clark et al. | |
| 2008/0060710 | A1 | 3/2008 | Carlson et al. | |
| 2008/0210423 | A1 | 9/2008 | Boney | |
| 2010/0019514 | A1 | 1/2010 | Steinwender | |
| 2011/0108277 | A1 * | 5/2011 | Dudley et al. | 166/308.1 |

FOREIGN PATENT DOCUMENTS

WO 2008071241 A1 6/2008

OTHER PUBLICATIONS

Rosensweig, Ferrohydrodynamics, Cambridge University Press 1985, Chapter 2, "Magnetic Fluids", 25 pages. Viota et al, "Study of the magnetorheological response of aqueous magnetite suspensions stabilized by acrylic acid polymers", Journal of Colloid and Interface Science, 324, 2008, pp. 199-204.
International Search Report of PCT Application No. PCT/US2010/058295 dated Aug. 30, 2011.

* cited by examiner

*Primary Examiner* — George Suchfield

(57) ABSTRACT

Apparatus and methods comprising a plurality of particles which are magnetically attracted to one another in response to exposure to an magnetic field, and which maintain attraction to one another after removal of the magnetic field, the attraction being disabled when the particles are demagnetized, whereby the particles operate to alter the rheological properties of a fluid in which the particles are mixed when the attraction is enabled or disabled is disclosed.

12 Claims, 10 Drawing Sheets

APPARATUS AND METHOD FOR TREATING A SUBTERRANEAN FORMATION USING DIVERSION

BACKGROUND OF THE INVENTION

1. Field of the Invention

This disclosed subject matter is generally related to field-responsive fluids, and more particularly to magnetorheological fluids with enhanced properties such as maintaining a highly viscous state after removal of a magnetic field.

2. Background of the Invention

Traditional magnetorheological fluids typically comprise magnetizable particles suspended in a base fluid. In the absence of a magnetic field, the magnetorheological fluids behave similar to a Newtonian fluid. However, in the presence of a magnetic field the particles acquire magnetic moments leading to interparticle forces between the particles. As a result of this interaction, the particles form chains and chain-like microstructures within the fluid that change the bulk rheological properties of the fluid. These chains are roughly parallel to the magnetic lines of flux associated with the field. Further, the magnetic field causes the fluid to enter a semi-solid state. This semi-solid state exhibits an increased resistance to shear. Resistance to shear is increased due to the magnetic attraction between particles of the chains. Adjacent chains of particles combine to form a wall which resists shear in the form of wall drag or fluid flow. The effect induced by the magnetic field is both reversible and repeatable for traditional magnetorheological fluids.

Hydrocarbons (oil, condensate, and gas) are typically produced from wells that are drilled into the formation containing them. For a variety of reasons, such as inherently low permeability of the reservoirs or damage to the formation caused by drilling and completion of the well, the flow of hydrocarbons into the well may be undesirably low. In this case, the well is “stimulated” for example using hydraulic fracturing, chemical stimulation, or a combination of the two.

Hydraulic fracturing involves injecting fluids into a formation at high pressure and rates such that the reservoir rock fails and forms a fracture (or fracture network), greatly increasing the surface area through which fluids may flow into the well. The number of horizontally drilled wells has continued to increase in the past few years and the need to maximize wellbore contact with the reservoir pose challenges in fracturing applications, especially in gas shale reservoirs. Shale beds are notoriously low permeability rocks, which means in general they need a hydraulic fracture stimulation to be economical.

When hydraulic fracturing or chemical stimulation stimulates multiple hydrocarbon-bearing zones, it is desirable to treat the multiple zones in multiple stages. In multiple zone fracturing, a first zone is fractured. After a first zone is fractured, the fracturing fluid is diverted to the next stage to fracture the next zone. This process is repeated until all zones are fractured. Alternatively, several zones may be fractured at one time, if they are closely located with similar properties. There are a number of methods for stress/pressure diversion in multiple fracturing stages e.g. bridge plug. Efforts are ongoing to find a cost-effective and controllable solution to enable multi-stage fracturing using diversion. In shale gas applications, maximizing reservoir contact through multi-stage fracturing is advantageous as this technique provides a cost-effective means of contacting the reservoir by creating large fractures. One of the main challenges in many tool-free multi-fracturing techniques is controllability of the fracturing process. Time dependency of the multi-stage fracturing process can be improved if an operator has capability of controlling the processes.

The presently disclosed subject matter addresses the problems of the prior art by addressing controllability concerns in multi-fracturing applications.

SUMMARY OF THE INVENTION

According to embodiments, an apparatus for altering one or more rheological properties of a fluid are disclosed. The apparatus comprises a plurality of particles which are magnetically attracted to one another in response to exposure to a magnetic field. This magnetic attraction of the particles to one another is maintained after removal of the magnetic field. The magnetic attraction of the particles operates to alter one or more rheological properties of the fluid in which the particles are mixed when the attraction is enabled or disabled.

In a further embodiment a method of well treatment is disclosed, the method comprising the following steps:

a) introducing a suspension comprising a plurality of particles which are magnetically attracted to one another in response to exposure to a magnetic field;

b) generating a magnetic field, the magnetic field affecting the magnetic particles;

c) increasing a viscosity of the suspension from the attracted particles;

d) forming a diversion system from the increased viscosity;

e) removing the magnetic field; and f) maintaining the attraction of the particles and increased viscosity after removal of the magnetic field.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

Figure 1:
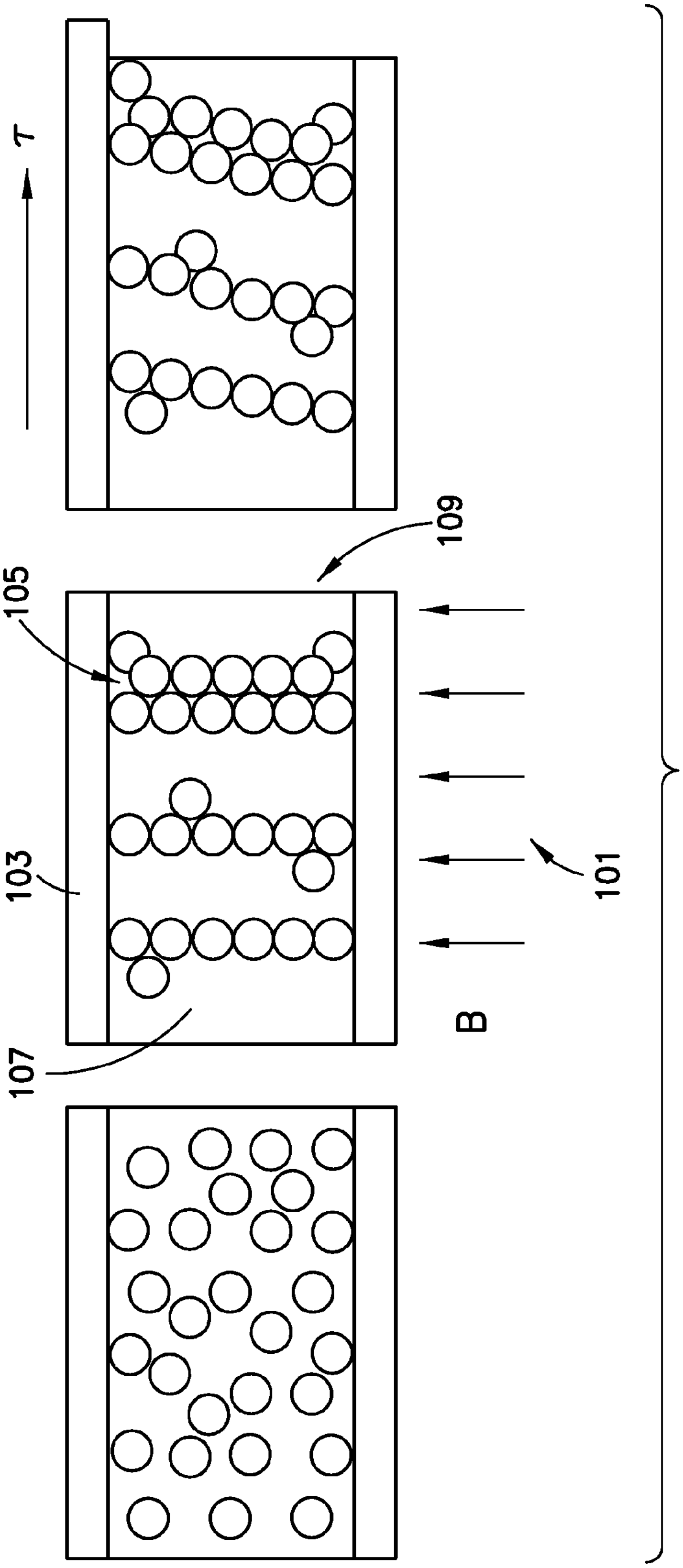
FIG.1 PRIOR ART
FIG. 1 illustrates magnetorheological fluid in response to a magnetic field.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicate like elements.

The present invention generally relates to systems and methods for utilizing magnetic fluids to address controllability concerns in multi-fracturing applications. One skilled in the art will readily recognize that the present invention may be utilized with a variety of alternative downhole tools or other elements not presently described herein including applications outside of the oilfield industry. Magnetorheological fluids typically comprise magnetically responsive particles suspended in a base fluid. In the absence of a magnetic field, the magnetorheological fluid behaves similar to a Newtonian fluid. However, in the presence of a magnetic field the particles suspended in the base fluid align and form chains which are roughly parallel to the magnetic lines of flux associated with the field. In the presence of a magnetic field the interaction between the suspension particles is greatly enhanced thus changing fluid viscosity in a manner roughly proportional to the magnetic field applied. As a result of this interaction, the particles form chains and chain-like microstructures within the fluid that change the bulk rheological properties of the fluid. Further, the magnetic field causes the fluid to enter a semi-solid state which exhibits increased resistance to shear. Resistance to shear is increased due to the magnetic attraction between particles of the chains. The effect induced by the magnetic field is both reversible and repeatable.

The bulk rheology of the fluid can often be well described by a yield stress fluid model such as Bingham, Hershel-Bulkley and Casson models. If Bingham plastic model is chosen for example:

$$\tau=\tau_y+\eta_p\dot{\gamma}$$

fluid is considered to be in a elasticity dominated (solid-like) state under stresses ($\tau$) less than the yield stress ($\tau_y$). The flow is only initiated if this critical value is exceeded. The ratio of proportionality between the stress difference from yield and shear rate ($\dot{\gamma}$) is called the plastic viscosity ($\eta_p$).

The change in fluid rheology is predominantly due to the yield stress which is a function of magnetic field. The change in plastic viscosity however may also be a source of change especially in colloidal dispersions of magnetic particles, namely ferrofluids. Overall, the viscosity ($\tau/\dot{\gamma}$) can be changed by modifying the yield stress or plastic viscosity of the fluid.

In certain oilfield applications the proportionality between the magnetic field and fluid viscosity in magnetorheology fluids may become an issue. Magnetorheological fluids are utilized in both low viscosity/yield stress (OFF-state) and in high viscosity/yield stress (ON-state). In applications where the ON-state needs to be maintained in large volumes a significant amount of magnetic field needs to be generated. The power requirements and the mechanical design complexities may become prohibitively high as the ON-state volume requirement is increased.

Embodiments of the present disclosure provide a controllable material sub-class called "switchable magnetic memory suspensions" or SMMS. Complexity and power requirements are minimized in these suspensions while the reversible and controllable properties of magnetorheological (MR) fluids are maintained. These "switchable magnetic memory suspensions" can be used in non-limiting examples as a means to isolate one fracturing zone from another fracturing zone while fracturing sequentially. These "switchable magnetic memory suspensions" undergo a magnetically triggered change in rheological properties which they retain after the magnetic field has been removed. This change in rheological properties is maintained until an applied field demagnetizes the magnetic particles. Therefore, the suspensions have no magnetic field (or power) requirement while used in a high-viscosity or ON-State and only require a magnetic field (or power) when the transport properties are required to be changed.

An embodiment of the present subject matter comprises a plurality of particles which are magnetically attracted to one another in response to exposure to a magnetic field. The pluralities of particles which are magnetically attracted to one another in response to exposure to a magnetic field maintain this attraction to one another after removal of the magnetic field. The magnetic attraction between the particles is disabled when the particles are demagnetized. The magnetic attraction between the particles operates to alter the rheological properties (e.g. yield stress or viscosity of a fluid in which the particles are mixed) when the attraction is enabled or disabled. Viscosity of the fluid is increased due to interparticle magnetic forces. Under an applied magnetic field the particles acquire magnetic moments that cause interparticle forces. As a result of this interaction, the particles form microstructures within the fluid, which causes a change in the bulk rheological properties.

FIG. 1 illustrates operation of a traditional magnetorheological fluid (109) within a conduit (103) such as a casing. The fluid (109) is a field-responsive fluid that includes magnetically responsive particles (105) suspended in a base fluid (107). In the absence of a magnetic field the magnetorheological fluid behaves similar to a Newtonian fluid. However, in the presence of magnetic field (101) the particles (105) suspended in the base fluid (107) align and form chains which are roughly parallel to the magnetic lines of flux associated with the magnetic field. When activated in this manner by a magnetic field, the magnetorheological fluid is in a semi-solid state which exhibits increased resistance to shear. In particular, resistance to shear is increased due to the magnetic attraction between particles of the chains.

An embodiment of the present subject matter provides a field responsive fluid wherein the effective viscosity/shear stress is altered and this alteration is maintained after the magnetic field is removed (101). These field responsive fluids are in effect permanently altered until a further demagnetizing field is applied. The viscosity of the fluid increases due to interparticle magnetic forces. The fluid (109) is a suspension of magnetically responsive particles (105) and these particles may be manufactured from hard ferromagnetic materials. These hard ferromagnetic materials retain a significant portion of their magnetic moment after the magnetic field is removed. Non-limiting examples of materials that can be used for the magnetorheological material of the subject disclosure are Samarium Cobalt, Neodymium iron boron, Alnico and magnetically hard iron, cobalt and/or nickel alloys.

Figure 2:
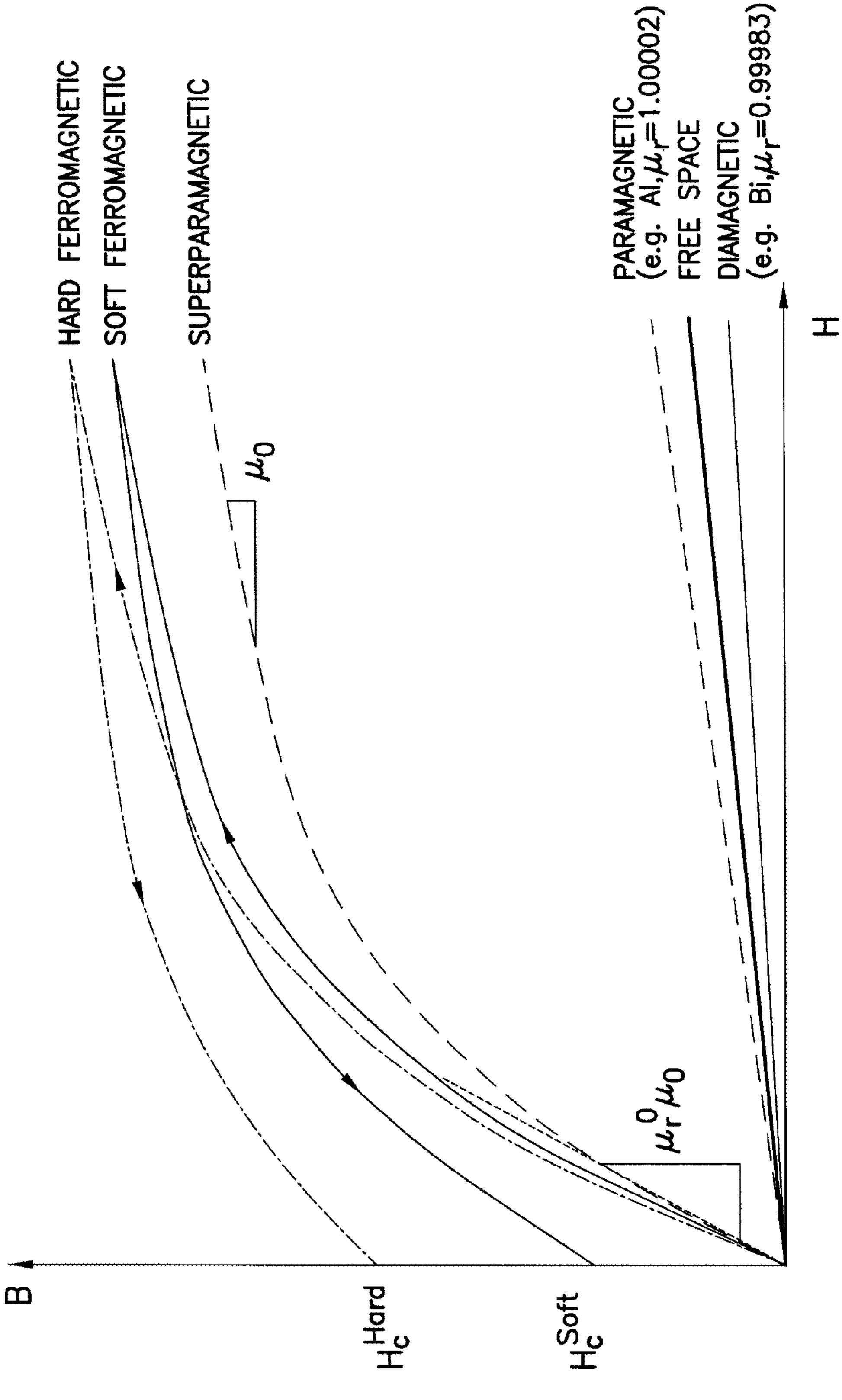
FIG. 2 illustrates the magnetic properties of common materials.

FIG. 2 illustrates the magnetic properties of common materials where H is the magnetic field strength and B is the magnetic flux density. The magnetization curve looks very different for ferromagnets to that of a diamagnetic or paramagnetic material due to quantum mechanical exchange interactions. Microscopically, these interactions dominate over dipole interactions in short length scales. In order to minimize energy caused by this interaction, magnetic domains are formed within the ferromagnetic material where magnetic moments of neighboring atoms are all aligned. However, at sufficiently large length scales, dipolar interaction dominates and domain walls are formed. At opposite ends of the domain walls the magnetic moment of the atoms are no longer aligned. Under an applied field, the magnetic domains and domain walls move to align with the field. Therefore the magnetization within the material, caused by this alignment, becomes significant and leads to macroscopically observed properties of ferromagnets such as the attraction to a magnet. When the applied field is removed, the domains tend to return back to their original alignments which minimize energy. However, mainly due to dislocations and impurities within the material, certain domains may not revert to their original position, causing a remnant magnetization in the material. This effect can be macroscopically observed in nails which are magnetized while being attracted to a magnet and in turn attract other nails due to remnant magnetization. Ferromagnets are categorized by their tendency to retain remnant field as either 'magnetically hard', retaining significant magnetization or 'magnetically soft' having negligible remnant magnetization.

Figure 3:
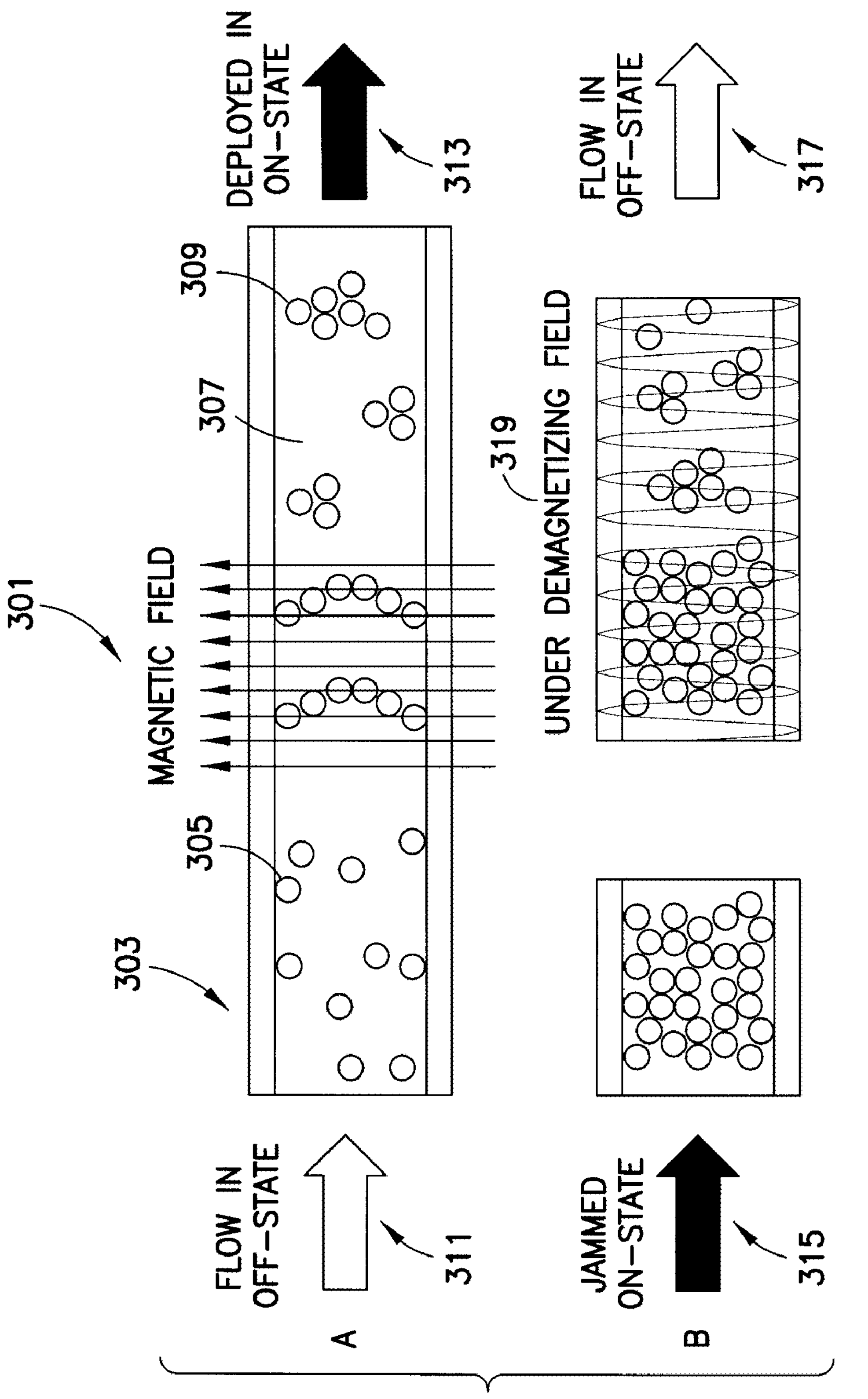
FIG. 3 illustrates the switchable magnetic memory suspensions.

FIG. 3 illustrates an embodiment of the present invention whereby the fluid (307) flows within a conduit (303) in one non-limiting example a wellbore which may be a cased or open hole wellbore. The fluid (307) is a field-responsive fluid that includes magnetically responsive particles (305) suspended in a base fluid (307). In the absence of a magnetic field the magnetorheological fluid behaves similar to a Newtonian fluid and flows through the conduit (303) in the OFF-state (311). However, in the presence of a magnetic field (301) the particles (305) suspended in the base fluid (307) align and form chains that are roughly parallel to the magnetic lines of flux associated with the magnetic field. The interaction between the particles causes self-assembly and increases the bulk fluid viscosity. The particles can form stable column-like structures in the presence of a magnetic field (301). When activated in this manner by a magnetic field, the magnetorheological fluid is in a semi-solid state and this semi-solid state exhibits increased resistance to shear. In particular, resistance to shear is increased due to the magnetic attraction between particles of the chains. On removing the magnetic field (301) the magnetically responsive particles (305) continue to interact with surrounding particles (309) and the apparatus is permanently in the ON-state (315). It is only when the particles are demagnetized by applying an under demagnetizing field (319) that the fluid returns to an OFF-state (317). Demagnetization is achieved by an application of a field which alternates in direction with a reduced amplitude in subsequent steps of alternations. As the material to be demagnetizaed is a microscopic particle which is not normally held stationary, the speed of alternations is required to be faster that the speed in which the particle can rotate within the suspension. The stable column-like structures that were formed (309) may be removed with application of fluid flow and a demagnetizing field. Much of the original OFF-state properties are recovered as there is no longer any appreciable remnant field within the particle and the magnetic state of the suspension is essentially identical to the original OFF-state.

Figure 4C:
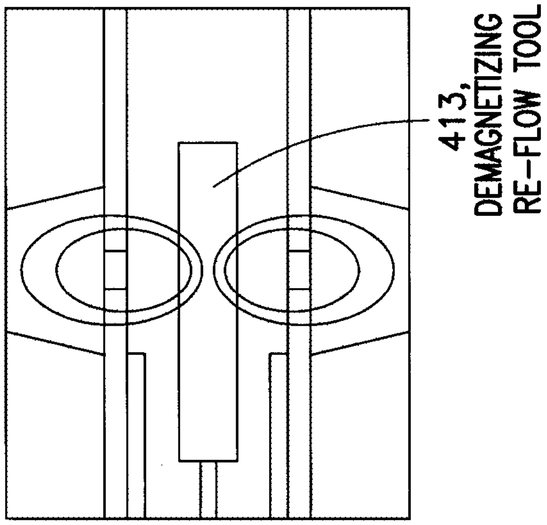
FIG. 4A-4C illustrates an embodiment of the subject matter disclosed using the switchable magnetic memory suspensions.
Figure 4B:
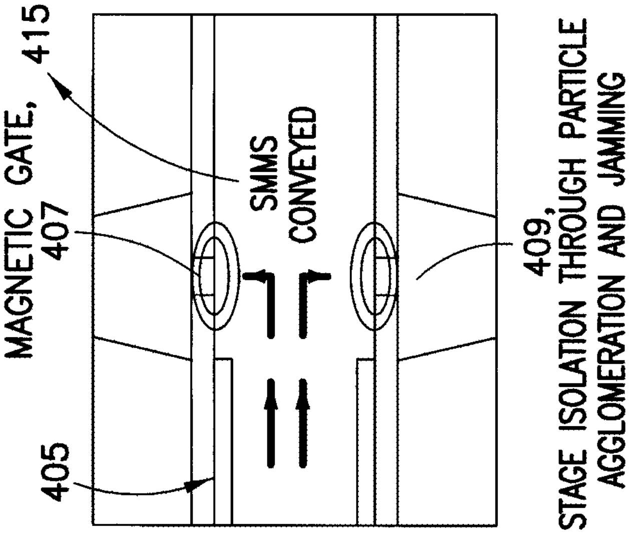
Figure 4A:
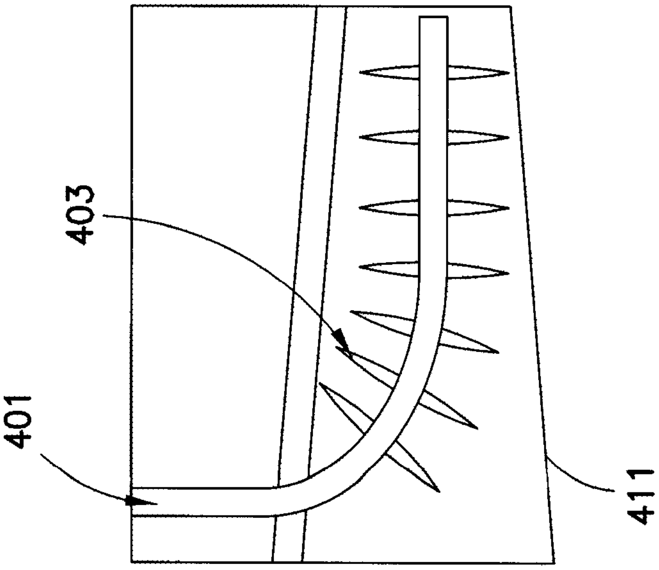

FIG. 4A-4C depicts an embodiment of the present invention where the "switchable magnetic memory suspensions" are used as a means to divert fluid flow. In one non-limiting example the "switchable magnetic memory suspensions" are used as a means to divert flow to a fractured stage of a reservoir. Furthermore, the present invention can be applied to diverting flow in a variety of situations beyond the present embodiment illustrated in FIG. 4A-4C, including but not limited to fail-safe magnetorheological actuators where a minimum damping or force is necessary to maintain desirable operating conditions in cases where a power source supplying a magnetic field is lost. Such a device may be used in an automotive shock damper. The application of the present embodiment to these alternative uses, although not explicitly addressed in detail, is contemplated to be within the scope of the present invention. In view of this, the illustrated embodiment is not intended to be limiting in scope. In one non-limiting example the well is drilled, cased and cemented. Fractured zones are opened by mechanical or pressure means. When pressure is applied all zones are subjected to roughly the same fracturing pressure but in general one zone will fracture first therefore disallowing other zones to be fractured as the treatment fluid is directed to the first fractured zone as this first fractured zone offers the least resistance. FIG. 4A depicts a portion of a horizontal well having a lateral section. The well is shown with casing (401) inserted through a target formation (411). The casing (401) can be either cemented or un-cemented. Although not shown in FIG. 4A, the disclosed apparatus and method can also be used on an open-hole lateral, which is a lateral section of a well without casing. Fracture openings (403) are formed in the casing (401) into the target formation (411). The fracturing openings (403) can be pre-formed in the casing (401) before insertion in the well, which is the case for slotted or pre-perforated casings. In addition, the fracture openings (403) can be formed after the casing (401) is inserted into the well. To overcome the problem of treatment fluid being directed to the first fracture zone the disclosed apparatus and method introduces a diverting agent (415) which is a fluid suspension containing magnetizable particles. This fluid suspension is a switchable magnetic memory suspension and contains magnetic particles which comprise magnetically hard material. Particle sizes are selected mainly by considering the following: (a) particles need to be large enough such that the interparticle magnetic forces are strong enough to dominate over thermal fluctuations; and (b) particles are small enough such that the gravitational settling time is long compared to requirements of the application. Common particle sizes range in size from 0.1 to 1000 micron. In bimodal magnetorheological fluids the rheological changes with an applied field is enhanced by adding particles smaller than the range described (~10 nm) to the fluid. These size particles may also be utilized in the diverting agent of the disclosed embodiments. The diverting agent (415) is capable of passing through the fracture openings (403) in the casing when the diverting agent (415) is in the OFF-State. Referring to FIG. 4B a sliding sleeve (405) can uncover and cover the magnetic gate (407) into a particular fracture zone (403). The sliding sleeve (405) is used to control the pressure differential between the inside and the outside of the casing string. Once the casing (401) installation process is complete and the casing string containing the magnetic gate (407) is installed in the well, normally cementing takes place to improve well stability and pressure containment. During cementing, the pressure connection between the inside and outside of the casing string through the magnetic gate (407) is highly undesirable. For this reason the sliding sleeve (405) is used. After cementing, the sleeve is opened by mechanical or pressure means.

The diverting agent (415) flows into a fractured zone (403) and passes through a magnetic gate (407). The magnetic gate (407) provides a magnetic field and this field energizes the diverting agent (415). The magnetic gate (407) is a flow channel which may occupy a portion of the flow channel or may occupy the entire flow channel. Therefore, as the fluid or a suspension flows through the channel the fluid or the suspension becomes exposed to an applied field. In embodiments of the present invention which use the switchable magnetic memory suspensions, once the switchable magnetic memory suspension flows through a magnetic gate of sufficient strength, the suspension is activated. The source of the magnetic field may be a single or a plurality of permanent magnets, or a single or a plurality of electromagnets. A magnetic circuit made up of magnetically permeable members may also be used to guide and direct the magnetic field in the vicinity of the magnetic gate (407).

Although MR fluids are suspensions of particles, if observed in a large enough length scale, they can be described as a continuum. A particular element of this continuum, which in the embodiments of this invention may include some suspension particles or completely consist of suspension particles, has freedom to move relative to other elements of the continuum or the walls of the flow conduit and therefore can result in a change in the magnetic field applied on the element. This change can occur by: (a) The magnetic field applied at a particular location may be time-varying (temporal) and thus this change in magnetic field changes the magnetic field applied on the element or (b) The fluid may be in motion through a direction where a gradient in magnetic field exists which is often referred to as advection or convection. There is also a possibility that the temporal and advective processes simultaneously contribute to the total change in magnetic field on the element. In terms of a constant field magnetic gate the change in magnetic field on the fluid is due to the advective change. In the embodiments of the present invention, a sequence of applied and removed magnetic fields are discussed. It is understood that, this sequence, may be caused by a temporal change in magnetic field or a fluid moving through regions of magnetic field that have spatial variation (advection).

The magnetic particles suspended in the diverting agent (415) align and form chains which are roughly parallel to the magnetic lines of flux associated with the magnetic field. The interaction between the particles causes self-assembly and increases the bulk fluid viscosity. The particles can form agglomeration thus jamming the entrance to the fractured zone (403). The particles maintain their interaction after passing through the magnetic gate (407) and this interaction is maintained after the energy field has been removed until the particles are demagnetized. FIG. 4C depicts a demagnetizing reflow tool (413) which demagnetizes the magnetic particles suspended in the diverting agent (415) causing the diverting agent (415) to return to an OFF-state. The demagnetizing reflow tool (413) is introduced into the wellbore utilizing any of the known wellbore techniques e.g. suspended on coiled tubing or on a wireline.

Figure 5:
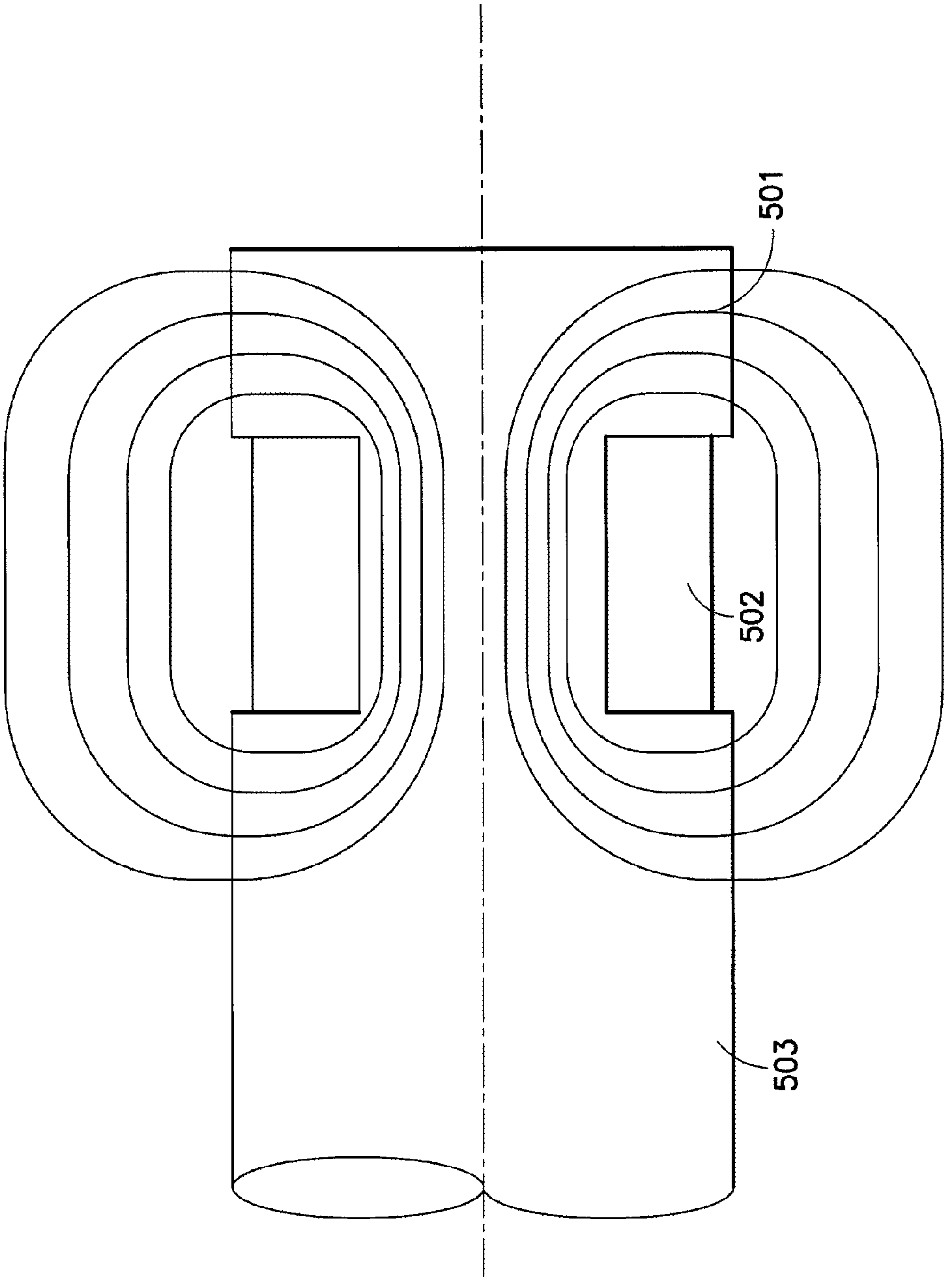
FIG. 5 illustrates an example of a reflow tool.

FIG. 5 depicts a reflow tool (503) comprising an electromagnetic coil (502) with a magnetic field (501). A magnetic field (501) supplied from the tool (503) to the diverting agent (415) causes the diverting agent (415) to demagnetize. The demagnetization is achieved by an application of a field which alternates in direction with a reduced amplitude in subsequent step of alternations. As the material to be demagnetized is a microscopic particle which is not normally held stationary, the speed of alternations is required to be faster that the speed in which the particle can rotate within the suspension.

Figure 6:
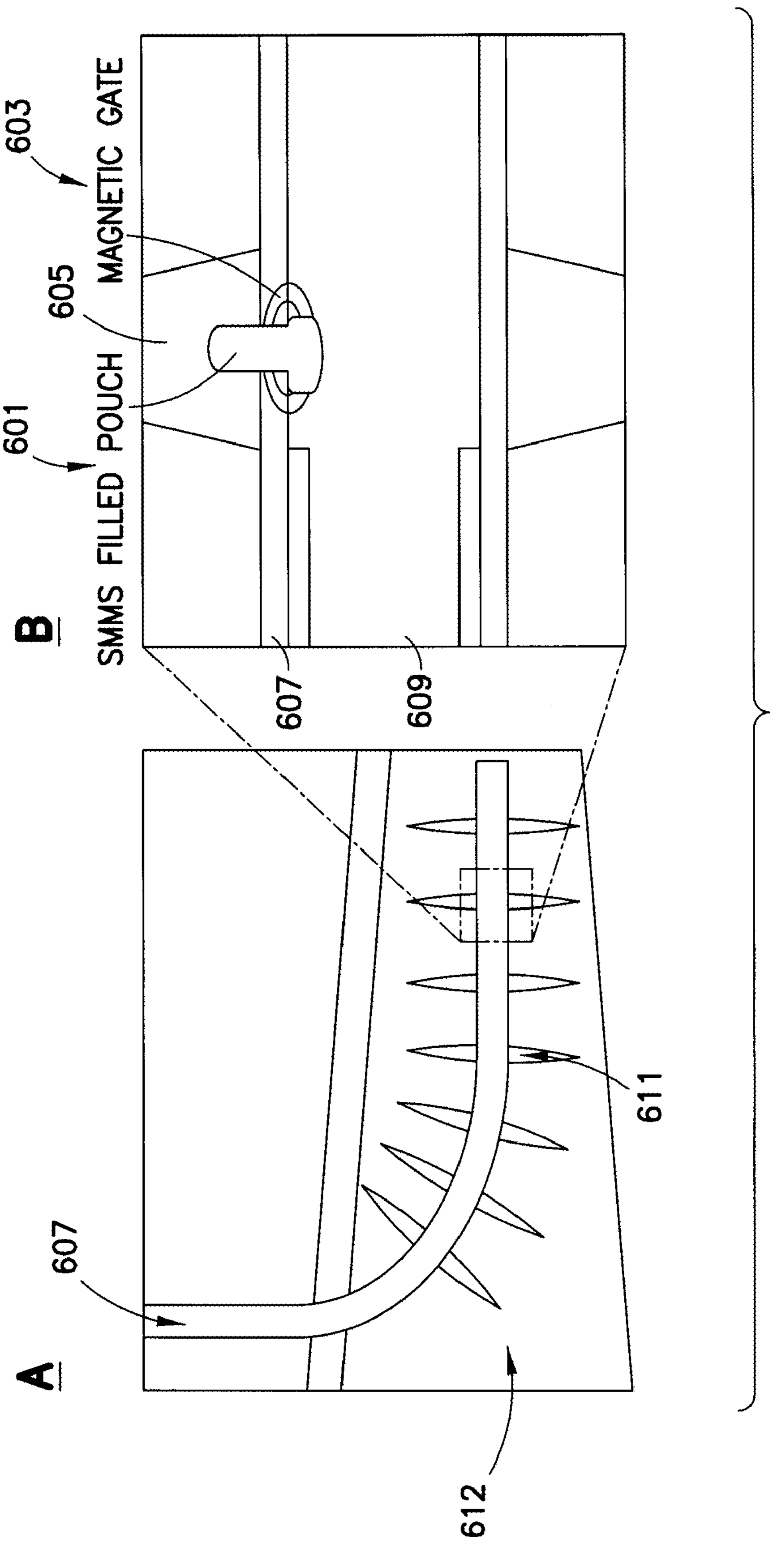
FIG. 6 illustrates a further embodiment of the invention using the switchable magnetic memory suspensions.

FIG. 6 depicts a further embodiment of the present invention whereby the diverting agent is delivered to a first fractured zone (611) in a target formation (612) via a pouch (605). The pouch (605) comprises a flexible, compliant elastomeric material which may or may not be permeable. The pouch may have any asymmetric shape. Non-limiting examples of the pouch are a spherical or mushroom shape.

The pouch (605) contains the diverting agent and once the pouch (605) comes in contact with the magnetic gate (603) the particles within the pouch react to the energy field, agglomerating and forming clusters and maintaining this interaction after the energy field is removed. The particles in the ON-State provide strength and rigidity to the pouch (605) thorough particle agglomeration and cluster formation. The strength and rigidity of the pouch (605) in the ON-State creates a blockage in the fractured zone where the pouch (605) is located thus creating a diversion of the treatment agent to the next zone to be fractured or in the case of an already fractured zone creates a blockage to this zone. The pouch (605) also creates a blockage to occur even if the zone is deformed and eroded during fracturing operations.

A further embodiment of the invention comprises a suspension of magnetic particles where the suspension comprises a multi-modal suspension of particles. In a multi-modal suspension the particle number density function has a plurality of local maxima with respect to particle size. Although, commonly the particle size peaks may have overlapping distributions, the plurality of the local maxima distinguishes the multi-modal suspensions from mono-modal suspensions which have a single peak in particle size. The particles can be of any shape, non-limiting examples of shapes are spheres, fibers, platelets, etc where one or a plurality of the particle size ranges are made up of magnetic material. This magnetic material may be magnetically soft or hard. Multi-modal distribution systems have a viscosity that is lower than mono-modal suspensions of equal particle volume fraction. Therefore, the transport of a multi-modal suspension can be achieved with less dissipation as compared to a mono-modal suspension of same particle volume fraction. In the multimodal distribution the particle size ranges are roughly an order of magnitude apart from each other and this distribution allows for the smaller particles to flow through the cavities formed between larger particles. In the disclosed subject matter the magnetic particles can be designed to make up one or more of the particle size peaks in a multimodal distribution of particles. In this case, when the particles are magnetized, they form clusters within the suspension affecting suspension rheology.

Figure 7:
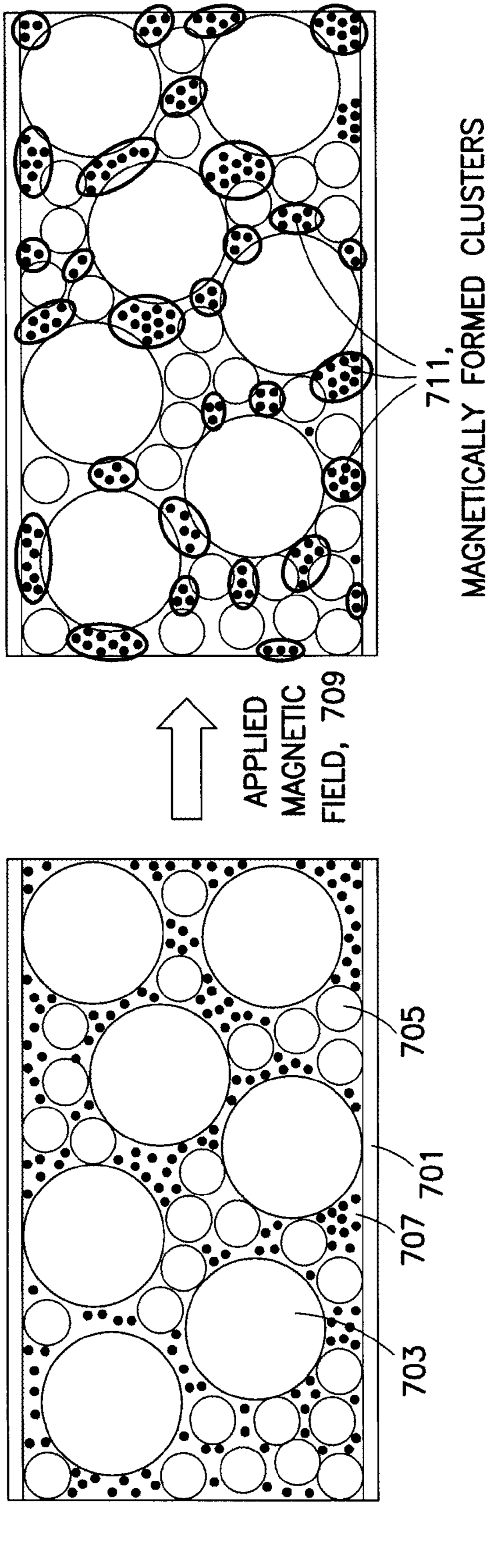
FIG. 7 illustrates a multi-modal distribution system for the switchable magnetic memory suspensions.

FIG. 7 illustrates a multi-modal distribution system (701) for the switchable magnetic memory suspensions. The multi-modal distribution system comprises a plurality of particle size ranges from large particles (703) to smaller particle sizes (705) to small magnetic particles (707). A magnetic field is applied (709) and this causes the small magnetic particles (707) to form clusters (711). These clusters (711) once formed affect suspension rheology. Medium and/or large particle may also be used as the magnetic particles (707) in alternative embodiments of the present invention.

Figure 8A:
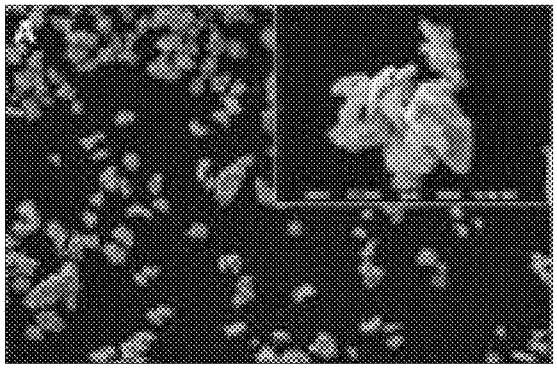
FIG. 8A, 8B, 8C, 8D illustrates the Scanning Electron Microscope (SEM) images of particles of embodiments of the subject matter disclosed.
Figure 8B:
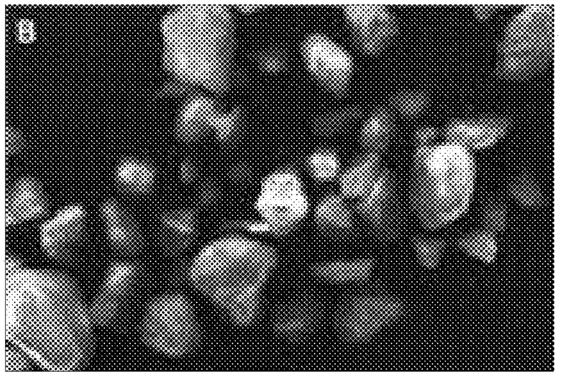
Figure 8C:
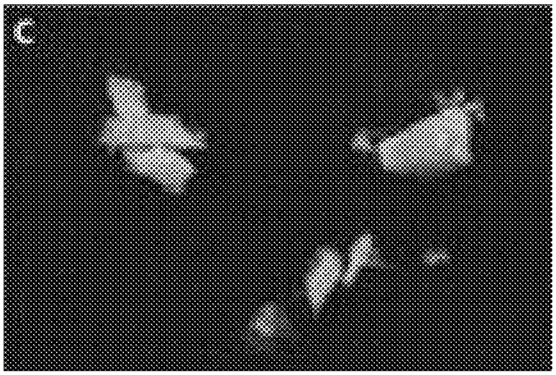
Figure 8D:
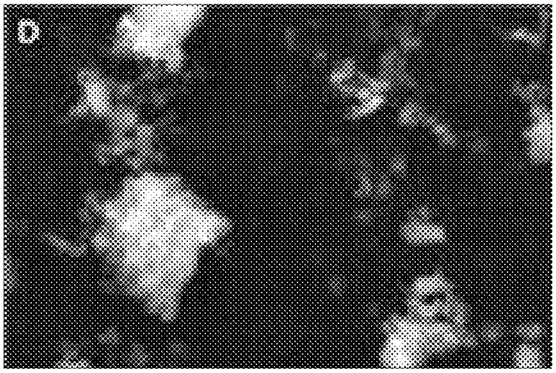

FIG. 8A-8D depicts Scanning Electron Microscope (SEM) images of particles. FIG. 8A depicts an image of particles comprising NdFeB permanent magnetic powder. FIG. 8B-8D depicts an image of large, medium and small multi-modal suspensions of particles, respectively. Materials which can be used for the multi-modal distribution systems can comprise a number of magnetic materials, some non-limiting examples, are Neodymium Iron Boron, Samarium Cobalt, Alnico, Carbon Steel, Iron and Alloy Steel. The materials can also comprise non-magnetic materials some examples are Silica, Carbon Black, Stainless steel (non-magnetic blends such as 316SS), Polymer, Soda-lime glass, Ceramic and non-magnetic metal. In multi-modal switchable magnetic memory suspensions, the modification made by a magnetic field input causes magnetic particle interaction and structure formation. These structures, which act similar to how larger particles would, significantly affect the suspension rheology. If magnetically soft particles are used the rheology change occurs while a magnetic field is present but if as described in earlier embodiments, magnetically hard particles are used, the rheological changes are permanent until a demagnetizing field is applied.

EXAMPLE 1

Figure 9:
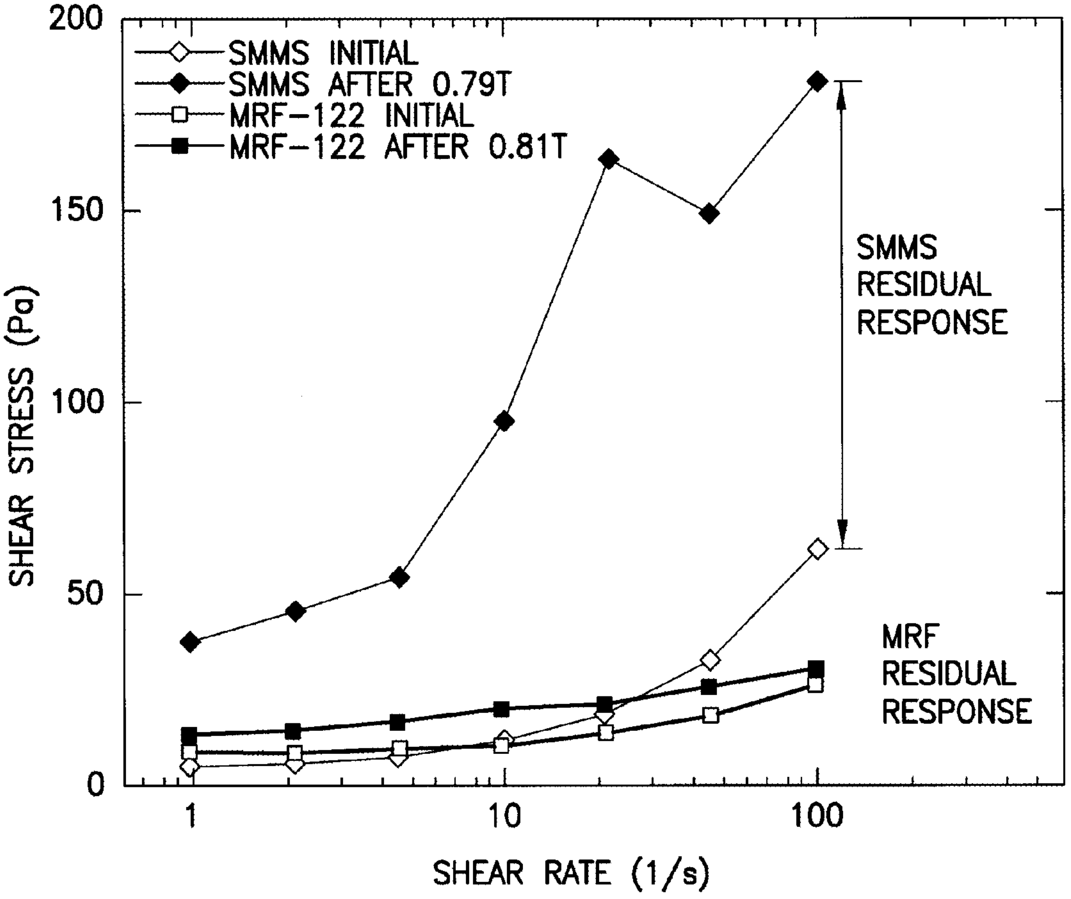
FIG. 9 illustrates rheological measurements of switchable magnetic memory suspensions.

A commercial available magnetic powder (D50=6 micron), NdFeB was obtained from Maqnequench. The material was selected for its particle size distribution and commercial availability. The powder was suspended in a viscoplastic silicone base in 10% volume fraction. Experiments were conducted on this fluid and a commercial magnetorheological fluid (LORF MRF-122, 22% v/v iron particles) for comparison purposes. Measurements were then taken of the fluid rheology using the Anton Paar MCR-501 rheometer with MRD-180 accessory. This is a parallel-plate device that imposes a shear stress on the fluid through the use of plates while simultaneously applying a magnetic field in the normal direction to the shearing plates. FIG. 9 depicts the rheological measurements of switchable magnetic memory suspensions (10% v/v NdFeB, D50=60 micron in viscoplastic silicone base) and a commercial magnetorheological fluid (LORF MRF-122, 22% v/v particles in a hydrocarbon base oil). The results demonstrate that switchable magnetic memory suspensions can retain memory of a magnetic field induced increase in viscosity. The result of the commercial magnetorheological fluid is also depicted for comparison purposes.

Figure 10:
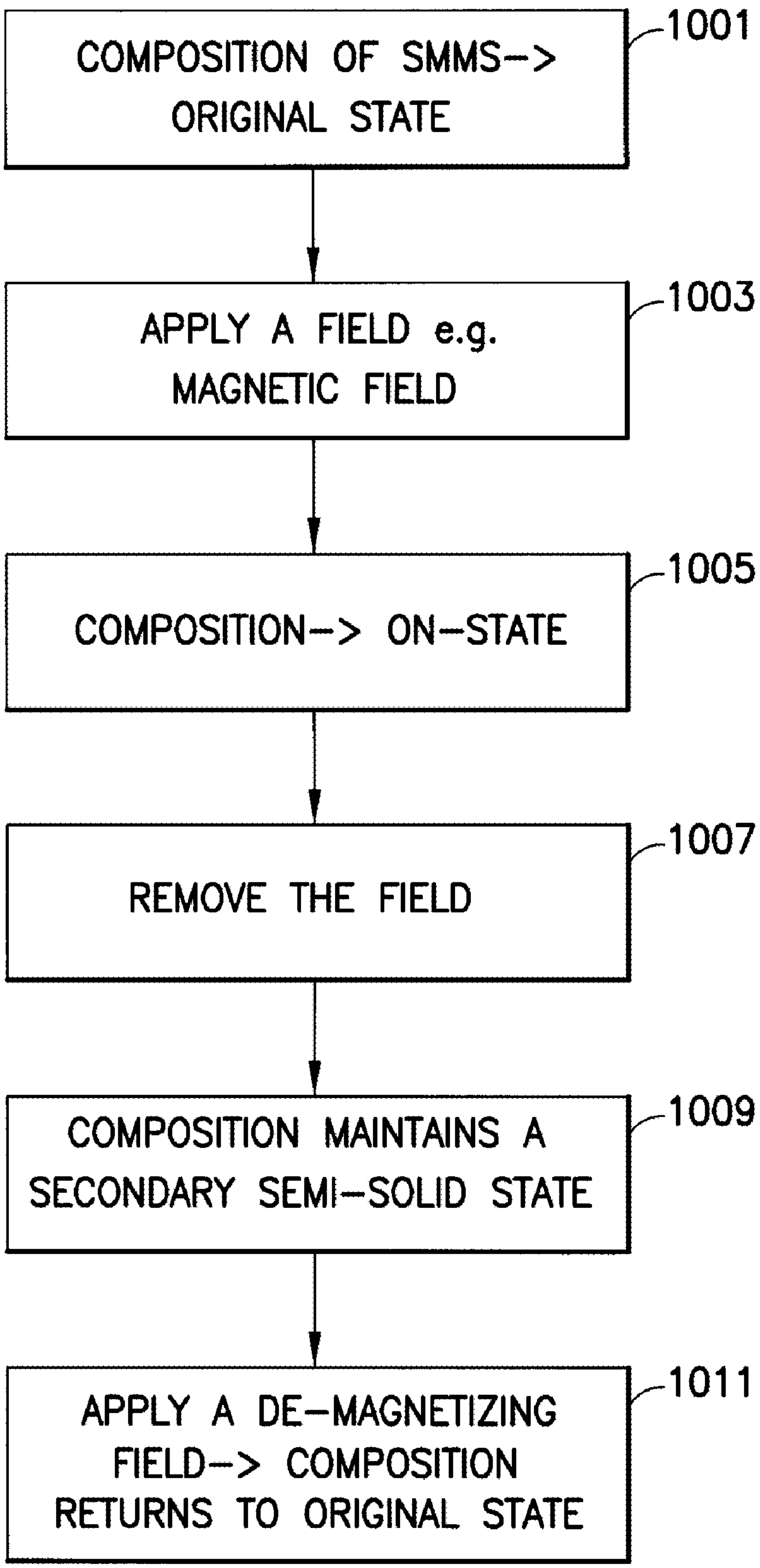
FIG. 10 is a flow chart illustrating an embodiment of the subject matter disclosed.

FIG. 10 depicts a flowchart illustrating the steps necessary in practicing one embodiment of the present invention. The composition comprises a switchable magnetic memory suspension. The magnetic particles within this suspension are made from a hard magnetic material. Before application of a magnetic field the composition is in an original state (1001). In this state the particles within the fluid are de-magnetized and have minimal magnetic interaction. The viscosity of the composition is at its lowest level due to this minimal magnetic interaction. On application of a magnetic field (1003) the composition enters a semi-solid state (1005) with an increased resistance to shear. On removal of the magnetic field (1007) the composition enters a secondary semi-solid state (1009) that continues to exhibit an increased resistance to shear due to formed clusters of particles within the fluid. On application of a de-magnetizing field the composition returns to its original state (1011).

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of well treatment comprising:

a) introducing into a well a suspension comprising a plurality of particles which are magnetically attracted to one another in response to exposure to a magnetic field;

b) generating a magnetic field to affect the plurality of particles;

c) increasing a viscosity of the suspension from the attracted particles;

d) forming a diversion system in the well from the increased viscosity;

e) removing the magnetic field; and f) maintaining the attraction of the particles and increased viscosity after removal of the magnetic field.

2. The method of claim 1 wherein applying a demagnetizing field disables the attraction.

3. The method of claim 1 wherein the act of introducing comprises pumping the suspension.

4. The method of claim 3 wherein the suspension comprises one or a plurality of pouches.

5. The method of claim 3 wherein the suspension comprises a multi-modal distribution of particle sizes.

6. The method of claim 1 wherein the act of forming a diversion system from the increased viscosity further comprises:

forming a plug in a zone of the well with the diversion system.

7. The method of claim 1 wherein the suspension is a diversion agent.

8. The method of claim 7 wherein the diversion agent is a controllable diversion agent.

9. The method of claim 8 wherein the ability to control comes from selectively enabling or disabling the magnetic field.

10. The method of claim 1 wherein the act of forming a diversion system from the increased viscosity is triggered on or off by the magnetic field.

11. The method of claim 1 wherein the act of forming a diversion system from the increased viscosity is sustained in the absence of a magnetic field.

12. The method of claim 1 wherein the well treatment is a fracturing treatment.

* * * * *